V. THOMPSON.
VENDING MACHINE.
APPLICATION FILED JULY 1, 1916.
1,256,844.
Patented Feb. 19, 1918.
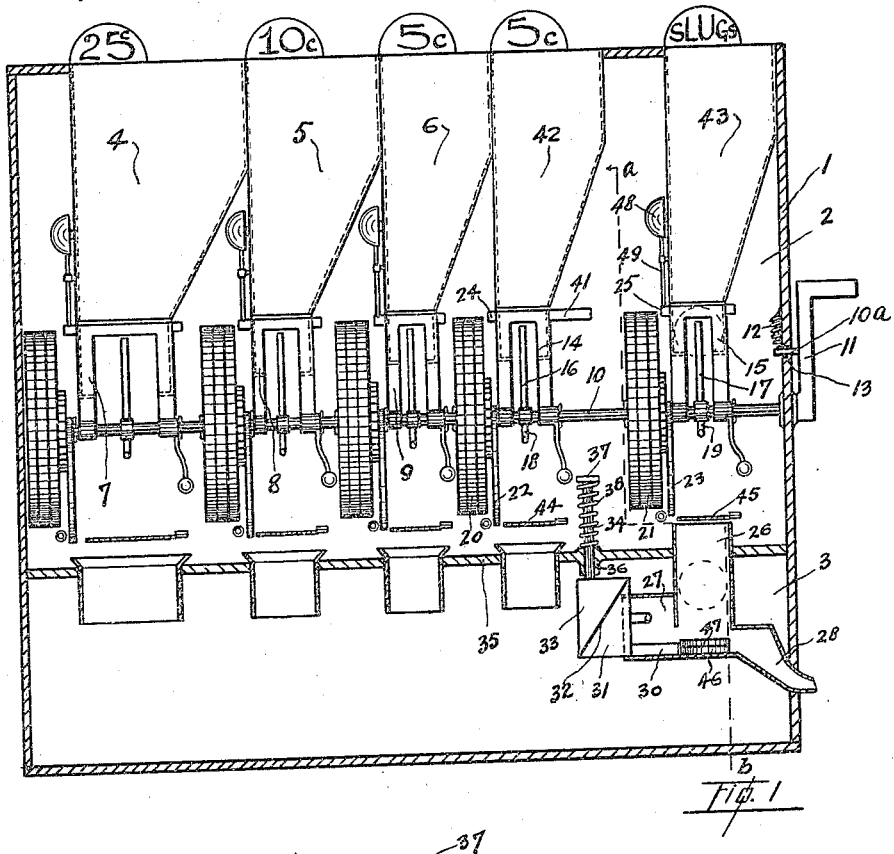
Fig. 1
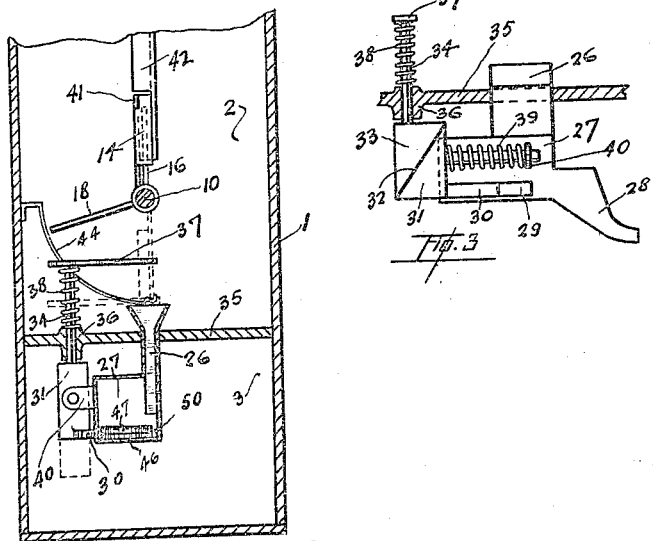
Fig. 2
Fig. 3
WITNESSES.
C. H. Perry.
J. S. Cottrell
INVENTOR.
VICTOR THOMPSON
by Fetherstonhaugh & Co.
Att'ys

UNITED STATES PATENT OFFICE.

VICTOR THOMPSON, OF VANCOUVER, BRITISH COLUMBIA, CANADA.

VENDING-MACHINE.

1,256,844.  Specification of Letters Patent.  Patented Feb. 19, 1918.

Application filed July 1, 1916. Serial No. 107,087.

*To all whom it may concern:*

Be it known that I, VICTOR THOMPSON, a subject of the King of Great Britain, and a resident of the city of Vancouver, in the Province of British Columbia, Canada, have invented certain new and useful Improvements in Vending-Machines, of which the following is a specification.

My invention relates to improvements in vending machines, and the object of my invention is to provide a simple device capable of being employed by a telephone company in combination with long distance call registering devices, such as that shown in my pending application filed May 22nd, 1916, Serial No. 99,094, and the use of which enables the company to cut the five cent rate and give two or more calls for five cents, if the company so desires.

I attain this object by the means illustrated in the accompanying drawings in which—

Figure 1 is a view illustrating the practical application of my invention to a telephone call registering device.

Fig. 2 is a part sectional view on the line a—b of Fig. 1.

Fig. 3 is an outside elevation of the slug discharging mechanism and chute.

Similar figures of reference indicate similar parts throughout the several views.

1, indicates a casing, divided into upper and lower compartments 2 and 3. the lower compartment serving as a collection box for the coins. Disposed in compartment 2 are the 25, 10 and 5 cent chutes, 4, 5 and 6 respectively, with their respective coin seats 7, 8, 9 and the mechanism associated therewith, all as found in the pending application above mentioned, and fully described and illustrated therein, the operating shaft of which mechanism, indicated in the present instance by the numeral 10, is extended, as shown in Fig. 1, and provided with the operating handle 11, which handle, after being actuated, as hereinafter descri ed, is returned to its normal position by means of a spring 12, which spring is connected to a pin 10ª in the side of the handle and which pin operates in a slot 13 in the side of the casing, the length of the slot determining the travel of the handle and being sufficient to permit of the seats, hereinafter mentioned, being moved from a normally vertical position to an inverted position.

14 and 15 indicate seats formed similarly to coin seats 7, 8 and 9, rotatably mounted on the extended portion of shaft 10, and operated in a similar manner by the fingers 16 and 17 respectively, secured to the shaft, which fingers are provided with extensions 18 and 19 respectively, these fingers and extensions being exactly the same as those described in my pending application already referred to, as also are the registers 20 and 21 and their operating levers 22 and 23, actuated by the projections 24 and 25 on the seats 14 and 15 respectively.

26 indicates a vertical chute, the mouth of which is disposed directly under the mouth of seat 15 when the same is inverted, the lower end of which chute opens into a casing 27 one end of which is formed as a discharge chute 28, the mouth of which projects exteriorly of the casing 1, all as shown in Fig. 1. Extending into the casing 27 through a slot 29 in one side of the same is a slidable member 30, the exteriorly projecting portion of which is enlarged, as indicated at 31 in Figs. 1 and 3, and provided with an inclined face 32, on which face is mounted a block member 33, as shown in Fig. 1.

The block member 33 is provided with a rod 34 which extends upwardly through the floor 35 of compartment 2, which rod is supported and guided in a suitable bearing 36 and is provided on its upper end with a bar 37 extending transversely of the casing 1, as shown in Fig. 2. 38 indicates a spring disposed between bar 37 and the bearing 36, while 39 indicates a spring disposed between the enlargement 31 and a bracket 40 secured to the side of casing 27, as shown in Figs. 2 and 3. 41 indicates an arm for actuating rod 34, as hereinafter described. 42 and 43 represent chutes similar to 5 cent chute 6, and coöperating with the respective seats 14 and 15.

Having thus indicated the principal parts of my invention I will now describe the manner in which it is used and operates.

In the machine shown in my pending application hereinbefore referred to, the telephone company, in fixing the rates, is limited, with reference to the 5 cent rate, to one call for each 5 cent coin placed in the 5 cent chute. However, in order to provide for greater flexibility in the fixing of rates and enable the company to give 2 or more calls for 5 cents I provide the construction described in the foregoing and illustrated in Fig. 1, that is, I add the two chutes 42 and 43, with their coöperating seats 14 and 15 respectively, coöperating fingers 16 and 17, registers 20 and 21, operating levers 22 and 23, and the curved plates 44 and 45, all of which construction is the same and operates in the same way as in the machine referred to. With such a combination machine, the telephone company supplies two or more slugs or disks, each of which represents a call, these being indicated at 46 and 47 in Fig. 1, and which slugs are adapted to occupy the seat 15 in the same manner as the 25, 10 or 5 cent coins occupy the coin seats 7, 8 or 9. The slugs, however, are normally contained in the casing 27, as shown in Fig. 1.

Now, suppose the company has fixed a rate of two calls for 5 cents, and has therefore provided two slugs, which are contained in casing 27. The subscriber, desiring to make a call at this rate, places a 5 cent coin in chute 42, which coin drops into coin seat 14. Pulling over handle 11, the coin seat is carried to the inverted position, whereupon the coin is discharged into the lower compartment 3. During the movement of the coin seat, however, the arm 41 comes in contact with the bar 37 and depresses same, thus forcing rod 34 and block member 33 downwardly and thereby moving the slidable member 30 longitudinally of the casing 27 and causing the slugs 46 and 47 to fall into chute 28 to be discharged through the side of casing 1 so that they may be obtained by the subscriber. On releasing handle 11 the parts just described are returned to their normal positions, the coin seat 14 by its counterweighted arm and finger extension, the bar 37 by spring 38, and slidable member 30 by spring 39.

To now make a call the subscriber takes the receiver off the hook and asks for the number in the usual way. When the party called has been found, the operator directs the subscriber to place one of the slugs in the slug chute, that is, 43 in Fig. 1, and pull the handle 11. The slug, dropping into seat 15, is engaged by the finger 17 as it is rotated by the operator of the handle. The finger thus carries the slug and the seat around until the seat is inverted, whereupon the slug drops out and falls through chute 26 into casing 27, falling on its face to rest on the bottom of the casing, as shown in Fig. 1. On the release of handle 11 the seat 15 returns to its normal position. A bell 48 and striking hammer 49 actuated by projection 25 on the seat 15 at the beginning of its forward movement is provided to indicate to the operator that the slug has been placed in the seat, and a projection 50 is provided in the casing 27 in the path of the falling slug to insure its tilting as it drops out of chute 26 so that it will fall over on its face in casing 27.

The other slug is retained by the subscriber for a future call, when the foregoing operation is repeated, at the termination of which the two slugs will be in casing 27, necessitating the payment of another 5 cents before they can be obtained for calls by the subscriber.

What I claim as my invention is:

1. A vending machine comprising a slug mechanism including a slug seat and a receptacle receiving slugs from said slug seat, mechanism for ejecting slugs from said receptacle, and an invertible coin seat adapted to be carried into contact with said mechanism during inversion for operating the same.

2. A vending machine comprising a coin mechanism including a rotatable coin seat, a slug mechanism including a slug seat and a receptacle receiving slugs from said slug seat, and mechanism operated by the coin seat for ejecting slugs from said receptacle comprising a depressible yieldably mounted wedge member and a longitudinally movable wedge member complementary to said first wedge member.

3. A vending machine comprising a coin mechanism including a rotatable coin seat, a slug mechanism including a slug seat and a receptacle receiving slug from said slug seat, and mechanism operated by the coin seat for ejecting slugs from said receptacle comprising a finger on said coin seat, a yieldably mounted wedge adapted to be depressed by said finger, a wedge complementary to said first wedge co-acting therewith and means on said second wedge for ejecting the slug.

4. A vending machine comprising a coin mechanism including a rotatable coin seat, a slug mechanism including a slug seat and a receptacle receiving slugs from said slug seat, and mechanism operated by the coin seat for ejecting slugs from said receptacle comprising complementary wedges adapted to be moved by the coin seat, and means for returning the wedge to initial position.

5. A vending machine, comprising a receptacle for slugs provided with a delivery chute and a receiving chute, a yieldably mounted wedge shaped member having a lateral extension longitudinally movable within the receptacle, a yieldably mounted wedge shaped member mounted on and complementary to the member aforesaid, a coin chute, a rotably mounted coin seat normally disposed below said chute and adapted to receive a coin discharged therefrom, said seat being adapted to engage when rotated the said complementary member and depress same, a slug chute, a rotatably mounted slug seat normally disposed below said chute and adapted to receive a slug discharged therefrom, means for rotating the coin seat when occupied, and means for rotating the slug seat when occupied so as to discharge the slug therefrom into the receiving chute of the receptacle.

6. A vending machine, comprising a receptacle for slugs provided with inlet and outlet openings, a coin chute, a slug chute, a manually operated rotatably mounted shaft, a coin seat having a projecting arm rotatably mounted on said shaft and normally disposed so as to receive a coin discharged from the coin chute, a slug seat rotatably mounted on said shaft and normally disposed so as to receive a slug discharged from the slug chute, a slug from said slug seat being discharged into said receptacle, a finger for the coin seat and a finger for the slug seat secured to said shaft and adapted respectively to engage when rotated the coin and slug occupying the respective seats so as to carry the seats respectively to coin-discharging and slug-discharging positions, a yieldably mounted wedge shaped member having a lateral extension longitudinally movable within the receptacle, a yieldably mounted wedge shaped member mounted on and complementary to the member aforesaid, said complementary member having a crosshead adapted to be engaged by the arm of the said coin seat as it is carried to the discharging position.

Dated at Vancouver, B. C., this 12th day of June, 1916.

VICTOR THOMPSON.

Copies of this patent may be obtained for five cents each, by addressing the "Commissioner of Patents, Washington, D. C."